Oct. 2, 1945.  E. W. KELLOGG  2,385,863

FILM DRUM DRIVE FOR PHOTOPHONOGRAPHIC APPARATUS

Filed Dec. 17, 1943   2 Sheets-Sheet 1

Inventor
E. W. Kellogg
By C. A. Duska
Attorney

Oct. 2, 1945.  E. W. KELLOGG  2,385,863
FILM DRUM DRIVE FOR PHOTOPHONOGRAPHIC APPARATUS
Filed Dec. 17, 1943  2 Sheets-Sheet 2

Inventor
Edward W. Kellogg
By
C. A. Buska
Attorney

Patented Oct. 2, 1945

2,385,863

UNITED STATES PATENT OFFICE 2,385,863

FILM DRUM DRIVE FOR PHOTOPHONO-GRAPHIC APPARATUS

Edward W. Kellogg, Indianapolis, Ind., assignor to Radio Corporation of America, a corporation of Delaware Application December 17, 1943, Serial No. 514,624

12 Claims. (Cl. 271—2.3)

This invention relates to a mechanism for driving the film drum of a photophonographic device, such as a film sound recorder or sound head, at a uniform speed so that sound may be recorded on or reproduced from the film with fidelity as to pitch.

The driving of such a film at a satisfactorily constant speed presents a special, and so far as I am aware, a unique problem, for the reason that the feed of the film is ordinarily controlled by sprockets in order that several driving systems may operate in strict synchronism. For example the sound and picture are recorded on machines driven by separate synchronous motors, and in a single machine having intermittent movement at the picture gate, the film must be driven at several points, and free loops of film maintained between these driving points. This is possible in a simple and practical way, only by propelling the film by means of sprockets, driven through gearing.

Sound recording is ordinarily done on fresh, unshrunk or substantially unshrunk film, while the sound is often reproduced from prints suffering from considerable shrinkage. This is particularly true in the case of sound motion pictures where the film has been repeatedly passed in front of an intense light source. If the film is propelled and controlled by sprockets, which themselves run at fixed speed, the number of sprocket holes fed per second must remain constant while the linear speed of the film varies in accordance with its length, or dependent on shrinkage. It is undesirable to reproduce or record the sound from or on the film upon a sprocket for the reason that the sprocket teeth themselves produce irregularities in the film motion. Therefore it has become almost universal practice to employ what are frequently called "mechanical filters." The term filter is better known as applied to electrical circuits which have the property of permitting certain components of the current to pass while preventing the transmission of other components. The commonest form of filter is known as a "low-pass" filter, which passes direct current freely while substantially eliminating all alternating currents above a certain frequency. The net effect is that rapid irregularities in the current are eliminated. The analogous mechanical system is an arrangement permitting continuous motion in one direction but tending to take out jerks and irregularities. The springs of an automobile in cooperation with the mass of the body take up the shocks of the road, but when the wheels go up a long hill the body goes up too. When it is desired to take out irregularities in the motion of some element such as a record, carrying recorded sound, the filtering system involves associating with the record an adequate mass or inertia and applying the necessary driving forces through elastic members such as springs. If this is done, irregularities can occur in the speed of the driving system without appearing in the motion of the record.

A constant-speed driving system can be provided for film by carrying the film past the point at which sound is recorded or reproduced, on the surface of a smooth drum on the shaft of which is mounted a flywheel. It would be possible to drive the flywheel through gearing from a motor, with a spring interposed to act as the elastic element of the filter, but this would fix the speed of the drum at a certain R. P. M. and hence at a certain peripheral speed relative to the rotation rate of the sprockets. As has been explained, the rate of rotation of the smooth drum cannot be set at a fixed value, owing to variations in the actual length of the film for a given number of sprocket holes. Therefore a system must be devised which permits the drum, at least over a limited range, to choose its own speed in a manner depending on the amount of slack film in loops between the sprockets and the drum.

Experience has shown that systems wherein the rotation of a flywheel is controlled by film loops, are subject to oscillations, and it becomes necessary to introduce damping. In accordance with my present invention I couple the drum to the flywheel through a frictional coupling of a type which has inherent damping properties, and at the same time I operate the flywheel at higher speed than the drum, and thereby make it possible to obtain the necessary inertia effect with a lighter and smaller flywheel than would otherwise be required.

One object of the invention is to provide a lightweight film drum drive.

Another object of the invention is to provide a film drive which will feed the film past the translation point at a uniform linear speed limited by the sprocket hole speed.

Another object of the invention is to provide a film drive which is sufficiently light in weight to be incorporated in 16 mm. single system recorders, single film system 35 mm. recorders, and other devices where minimum size and weight are important.

Another object of the invention is to provide a film drive which is effectively damped.

Another object of the invention is to provide a film drive including a flywheel on the film drum, the rotation of which is effectively damped.

Another object of the invention is to provide a film drum drive in which the torque has a definite relation to the film speed.

Another object of the invention is to provide a film drum drive which will be low in cost.

Another object of the invention is to provide a film drum drive which can be quickly brought up to full speed.

Other and incidental objects of the invention will be apparent from a reading of the following specification and an inspection of the accompanying drawings in which.

Figure 1:
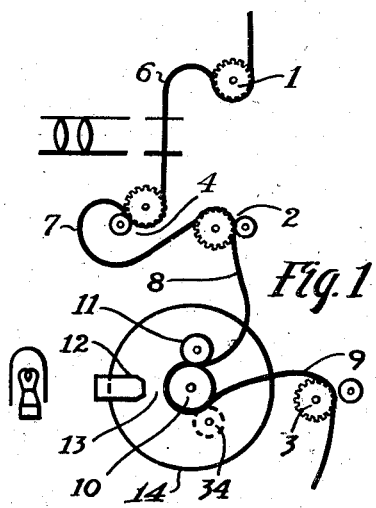
Figure 1 is a schematic drawing of the film motion system of a projector, used in explaining the problems.

Fig. 1 shows the relations in a combined motion picture projector and sound reproducing device, wherein continuously rotating sprockets are shown at 1, 2, and 3 while an intermittent sprocket is shown at 4, which moves the film quickly from one picture frame to the next, allowing it to remain stationary three-fourths of the time. It is obvious that the action of intermittent sprocket 4 requires that there be plenty of slack film in loops 6 and 7, and only by employing sprockets geared together can it be assured that there will be a constant amount of slack film in these loops and in the loops 8 and 9. The sound drum is shown at 10 with a pressure roller at 11 which prevents the film from slipping on the drum, while an optical system 12 concentrates light on the film at the point 13. A photocell, not shown, receives the light which is transmitted through the film at point 13 and the output of the photocell is amplified to provide the audio frequency currents for operating loudspeakers. It is the sound drum 10 which controls the speed of the film as it passes the reproducing point 13, and systems for providing constant speed are concerned with obtaining the maximum uniformity of rotation of said drum.

Referring again to Fig. 1, if the sprockets 1, 2, and 3 run at a fixed rate there will be some variations in the speed at which drum 10 must run, depending on the shrinkage of the film. Associated with drum 10 is a flywheel or rotary stabilizer indicated by the circle 14. The function of the rotary stabilizer will presently be explained. For the immediate discussion we shall assume that 14 represents a flywheel rigidly attached to the shaft of drum 10. The system comprising the inertia effect of flywheel 14 and elasticity of film loops 8 and 9 constitutes a mechanical filter capable of smoothing out irregularities in the velocity of the film as it passes through the reproducing point 13. The irregularities to which I have reference are those inherent in sprocket tooth action plus imperfections in the pitch of the teeth and the perforations, eccentricities in sprockets, and imperfections in gears. Motion picture film is not perfectly limp like a piece of thin cloth but has considerable stiffness and can act as a spring. Hence the loops 8 and 9, especially if the roller arrangements are designed with a view to taking full advantage of the inherent elasticity of the film, are effective as springs. If the drum 10 runs too slowly loop 9 is pulled tighter, and speeds up the drum, while if the drum runs too fast loop 9 acquires extra slack and pulls forward with less than normal or average tension, or in an extreme case loop 8 may become tight enough to pull back appreciably. It is obvious that considerable speed fluctuations at sprockets 2 and 3 can occur with no appreciable effect on the drum speed but only slight pulsations in the amount of slack in the loops 8 and 9. As explained in my U. S. Patent Re. 19,270, power may be supplied to the shaft of drum 10 in suitable magnitude for overcoming bearing friction but in such a manner that it does not fix the speed of the drum, or alternatively the drum shaft may be mounted in low-friction bearings so that the entire power for running the drum can be supplied by tension in loop 9 without pulling this tight enough to cause it to become objectionably stiff.

The system as illustrated in Fig. 1, comprising the elastic properties of loops and the inertia effect of the flywheel, is subject to oscillations at a frequency determined by the stiffness of the loop and the mass of the flywheel. The only known cure for this condition is to provide damping. One method of providing damping is to deflect the drum-pulling loop 9 by a flexibly mounted idler roller which will move when the tension on the film changes and to connect the movable roller to a dashpot or other energy-absorbing device. This construction is shown in my U. S. Patent Re. 19,270, which also discusses the requirements for maintaining flexible loops.

Another means of producing damping is to associate with the drum shaft and flywheel, means for causing a retarding torque when the speed is above normal and a forward torque when the speed is below normal. The elastic film loops do not produce this effect, for they exert retarding or accelerating forces not in accordance with the momentary speed but dependent on the position of the drum, whether it is ahead of or behind the normal position which it should occupy. In other words, damping requires forces which are in phase-quadrature with the purely elastic forces. Methods of providing damping effective at the drum shaft are described in my aforementioned U. S. Patent Re. 19,270 and in my U. S. Patent No. 1,969,755, in C. R. Hanna Patent No. 2,003,048, in Reynolds Patent No. 2,013,109, and in Loomis and Reynolds Patent No. 2,019,147. It is desirable for a better understanding of the present invention to describe briefly at this point the two most important forms of flywheel dampers covered in the above-mentioned patents. The one, generally known as the Magnetic drive, is covered in U. S. Re. 19,270 and 1,899,571; and the other, known as the Rotary stabilizer, is covered in the Hanna and Reynolds patents.

The magnetic drive consists fundamentally in providing the drum flywheel with a copper flange spanned by the poles of a magnet which can be rotated around the same axis, but the magnet is on independent bearings. Whenever there is relative motion eddy currents are produced in the copper flange which produce a dragging effect proportional to the speed difference. The magnet is geared to the main driving motor, and its speed is therefore not influenced by any possible reaction between it and the flywheel. Thus the electromagnetic drag which damps any oscillation of the drum flywheel reacts against the practically "solid" magnet.

The magnets may be driven at normal drum speed, in which case they will provide damping only, and the film will have to provide enough torque to overcome drum bearing friction. Or the magnet may be run somewhat above normal drum speed and in addition to damping provide a forward torque which relieves the film of the bearing load. When this is done it has been usual to provide enough additional torque in this manner so that one of the film loops actually holds back on the drum. For example if such an overdrive were used in the machine illustrated in Fig. 1 there would always be some tension in loop 8, while loop 9 would be relatively slack. Under these conditions the appropriate place for the pressure roller would be on the lower side of the drum, as shown dotted at 34, but a guide roller would still be needed at 11.

Figure 2:
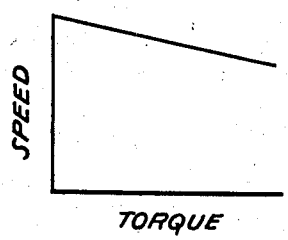
Figure 2 shows the relation between transmitted torque and the speed of the driven member, in the case of a damped driving system.

The magnetic drive applies a torque to the drum shaft which becomes less as the speed of the drum increases, or in other words it has a drooping characteristic as illustrated in Fig. 2. Such a driving system permits the drum to run at whatever speed is required in view of the film shrinkage, without too much change in the tension in the loops, and at the same time provides the necessary damping, the slope of the characteristic being a graphical representation of the damping resistance.

In the case of the rotary stabilizer a heavy flywheel is mounted on ball bearings inside a sealed shell, the free space being filled with oil, and the shell is locked to the drum shaft. The damping force is exerted between the shell and the free flywheel.

The magnetic drive and the rotary stabilizer utilize a certain principle in common. In both cases damping is provided by coupling the drum shaft to a second coaxial rotating member through a coupling having continuously and aperiodically yielding characteristics, or what I shall for brevity, designate as a "viscous" coupling, the word viscous being understood in a very broad sense. The member to which the drum shaft is coupled is capable of rotating independently of the drum shaft, and is restrained, either by its own inertia or by positive connection to a driving motor, from participating in such small fluctations in speed as may occur in the drum shaft rotation.

My present invention constitutes a new method of providing damping at the drum shaft. It is like the methods already described, in that the drum shaft is coupled to another rotating element, through a coupling which has damping properties, but differs from the former systems in that the other rotating element is not coaxial, and in that the coupling does not utilize viscous fluid, nor magnetic action. According to my invention I mount on the drum shaft a rubber tired wheel of suitable design, and maintain in contact with the rubber tire a wheel or roller, preferably of smaller diameter, which in turn may be connected to a flywheel or may be driven, directly or indirectly, by an electric motor. In any case the contacting roller must be capable of resisting changes of speed, just as the independent coaxial member of the magnetic drive or rotary stabilizer must resist rapid changes of speed, or in other words have a high mechanical impedance with respect to speed variations, just as an electrical inductance offers high impedance to current variations.

The damping properties of the connection through the rubber tire between the wheel and the roller are due to a peculiar physical characteristic of the rubber tire which renders its behavior very similar to that of the magnetic or viscous drives above referred to. This characteristic came to my attention in the course of experiments in which a driving system with a rubber tire was being employed to rotate a disc record, in which case it was desired that the speed be constant or independent of load, but it was found that with increasing load the turntable ran more slowly although the small contacting roller ran at fixed speed. Especially important for the present application are the facts that the decrease in speed was found to be a continuous and linear function of the load torque, and that at moderately large loads, the speed of the turntable although reduced, was as uniform as at no load, provided the load itself was steady. Such a relationship cannot be accounted for on the theory that there is any slipping between the surfaces. The effect is apparently due to the elasticity of form of the rubber which causes it to yield tangentially at the point of contact with the driving pulley when a tangential force is applied. The effect of this deformation of the rubber tire is to cause a momentary and local change of surface speed of the rubber, relative to the average speed of the circumference. Suppose for example that power is being supplied from the small solid pulley to the larger rubber tired wheel; just as a given part of the surface of the rubber tire reaches the point of contact, it finds itself jerked forward by the action of the driving roller. After passing the point of contact, the elastic properties of the rubber cause it to be restored to its normal shape, and during this period the point on the surface moves relatively backward, or its forward motion is at less than average velocity. The two deviations from normal velocity must of course have equal and opposite net effects on total travel, but the fact that the excess velocity occurs at the driving point, results in a lowered speed of the driven pulley relative to the driving pulley, as compared with the speed as calculated from the relative circumferences of the two pulleys or wheels. If no tangential force is being transmitted from one wheel to the other, there will be no tendency for the rubber of the tire either to be pulled forward or held back at the contact point, and thus little if any departure from its normal speed. The deformations of the tire are, within a limited range, directly proportional to the forces which produce them, and this relationship produces the result that the departures of speed ratio from the normal ratio are directly proportional to the transmitted torque, and this is true for both positive and negative values.

The action I have just described might be called "slip," but if this term is used, it must be understood as like the "slip" of an induction motor, which is a continuous function of load, and is not like ordinary slipping of contacting surfaces, which is a discontinuous function of tangential force with no definite relationship between the force and the resultant velocity of slipping. If slipping of the ordinary kind took place it would defeat the purpose of the invention of producing uniform velocity, for any actual sliding would act irregularly.

In one respect the action of the rubber tire drive is different from that of a viscous or magnetic connection. In the case of the last-mentioned couplings the speed difference bears a fixed relation to the transmitted torque independent of the absolute speed with which both members run. In other words, if the magnet runs 10 R. P. M. and the flange is stationary, the torque will be the same as is exerted when the magnet runs 190 R. P. M. and the flange 180 R. P. M. In the case of the rubber tire drive the speed difference is roughly proportional to the transmitted torque multiplied by the average speed. At standstill there is no creep or slip. If four inch-ounces results in 5 R. P. M. slip of the rubber tired wheel when it is running at 90 R. P. M., the same torque would produce approximately 10 R. P. M. slip when the wheel is running 180 R. P. M. This difference between the previous viscous connections and the rubber tire drive is not of importance in the present application, since the drum always runs at substantially the same speed. I am here simply pointing out that the two damping systems are not necessarily alike in all respects.

The creep effect just described bears some resemblance to a property of rubber tires described and utilized by C. A. Hoxie in U. S. Patent No. 1,756,864 but is not the same nor does it give the same result, nor is it, in my invention, used in the same way.

Apart from the essential feature of introducing a viscous coupling between the drum shaft and another rotating pulley, and thereby providing damping of the otherwise oscillatory drum drive system, the rubber tire coupling system affords certain practical design advantages. For many applications it is desirable to obtain the required flywheel effect by means of a small flywheel running at higher speed than that of the drum. This results in a major reduction in weight and some reduction in space requirements, since the size of the flywheel (measured in terms of movement of inertia) necessary to produce a given inertia effect, varies inversely as the square of its speed relative to that of the drum. There are no methods of coupling between two non-coaxial shafts which do not themselves introduce irregularities. For the stepping up the speed of the flywheel gears are not to be considered, and most belting arrangements produce serious disturbances, generally due to the joint or splice. Moderately satisfactory couplings have been obtained with frictional connection between metal rollers very carefully constructed and finished. The coupling through a rubber tire, provided the tire has been carefully trued up by a grinding operation, and the pulley which it engages runs true, has been found to be one of the best of known arrangements from the constant speed standpoint for coupling two shafts together for the transmission of small amounts of power.

It is thus a second feature of my present invention that I provide the necessary damping properties in combination with a satisfactory means for operating the flywheel or other uniformly rotating pulley at higher speed than the drum shaft.

Figure 3:
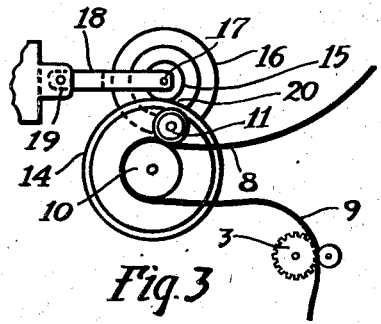
Figure 3 shows in front elevation the relation of the several elements in one embodiment of my invention.

In its simplest form my invention is illustrated in Fig. 3, wherein various structural elements are omitted in order to show the rollers. Film from a slack loop 8 is fed onto the drum 10 under a combination guide and pressure-roller 11. The drum is driven entirely by tension on the film loop 9 which is pulled by the sprocket 3 which runs at substantially uniform speed, being geared to the driving motor. The rubber tired wheel is indicated at 14. Resting lightly against the rubber tire is a smaller roller 15 on the shaft of which is a small flywheel 16. The shaft of the flywheel runs in two low-friction bearings 17 in a yoke 18 pivoted to the frame of the machine at 19, thus fixing the radial pressure at substantially the weight of the small flywheel and the associated parts. If tests indicate that the pressure should differ from this it can be increased by use of springs or the position of the contact point 20 can be shifted around to the side, where only one component of the weight will cause radial thrust. During normal running a very small amount of power is delivered from the wheel 14 to the roller 15. If any fluctuation occurs in the speed of 14, the inertia of flywheel 16 will make it resist changing its own speed and thus an alternating component of force is introduced at 20 and this results in variations in the creep which absorb energy and thus damp out any oscillations which might have started.

Figure 4:
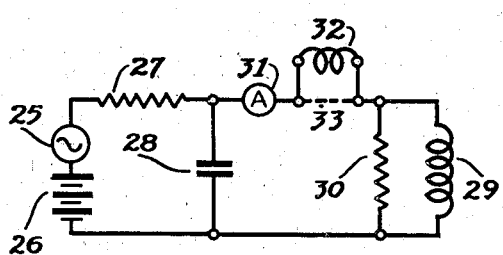
Figure 4 is a diagram of an electrical circuit analogous in its action to the mechanical system of this invention.

An analogous electrical circuit is shown in Fig. 4. A disturbance is indicated by alternator 25 acting through resistance 27, while a battery 26 supplies a continuous current analogous to the forward rotation of the drum. Most of the alternating current produced by alternator 25 is by-passed through capacitor 28, which is analogous to the flexibility of film loop 9. The continuous current passes through inductance 29 which corresponds to the flywheel 16 whose inertia tends to keep its rate of rotation constant. The slip or creep effect of the rubber tire corresponds to the effect of resistor 30 in multiple with the inductance 29. An ammeter is shown at 31 indicating that this is the place in the electrical circuit where we would like to have minimum current fluctuation, just as it is desirable to have minimum speed variation at the surface of drum 10. In Fig. 3 there is no considerable mass analogous to inductance 32 of Fig. 4. Hence the electrical analog of Fig. 3 would omit inductance 32 and show the circuit closed through the dotted line 33. Anyone familiar with electrical circuits will recognize that if resistance 30 is made extremely high or infinite, which would correspond to a fixed speed ratio and no creeping, oscillations can exist through the circuit comprising element 28 and 29. It will also be recognized that such oscillations can be effectively stopped by employing a suitable value of resistance at 30.

Figure 5:
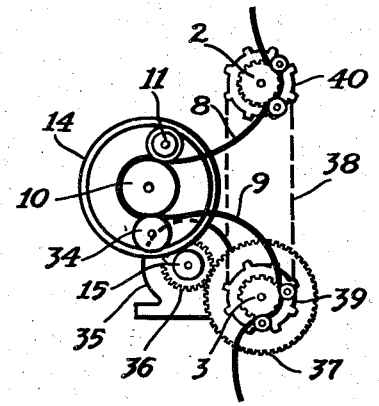
Figure 5 is a front elevation of a form of the invention in which power is supplied to the drum by a motor, whose armature furnishes the necessary flywheel effect.
Figure 6:
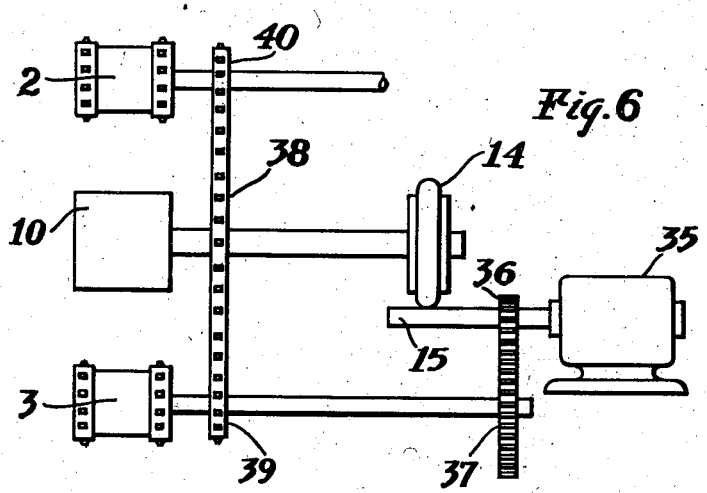
Figure 6 is a side elevation of the form of the invention as shown in Fig. 5.

Another form of the invention is shown in Figs. 5 and 6. In this case the rubber tired wheel is coupled to a pulley on the shaft of a driving motor 35, whose armature has sufficient moment of inertia to provide the desired flywheel effects. The same motor drives the sprockets 2 and 3 through gears 36, 37 and the chain belt 38 with its associated sprockets 39, 40. Although Fig. 6 does not show the exact location of chain 38, it is to be understood that it does not engage nor interfere with the shaft of drum 10. Fig. 5 shows this.

Coupling the rubber tired wheel 14 to the driving motor instead of to a separate flywheel does not necessarily result in any complication of mechanism, since a driving motor is always required. The speed of the shaft of the motor itself is in general very free from fluctuations, and it thus serves the purpose without ordinarily requiring any additional high speed flywheel. The advantage of thus positively driving wheel 14 is largely in the fact that it provides very quick starting for the entire mechanism.

It is in general desirable to throw the principal slack definitely either into the feeding film loop 8 or the pulling film loop 9, leaving the other loop under some tension, in which case the loop under slight tension will do the controlling of the drum speed. The position of the pressure-roller is determined in view of which loop is under the greater tension. For this reason the no-load speed ratio between wheel 14 and coupled roller 15 would in general be calculated to be such that in the absence of film drum 16 will run either slightly slower or else slightly faster than its normal range of running speeds with film in place. Fig. 5 is drawn to represent conditions when the drum is over-driven. Film loop 8 is under some tension and controls the speed of the drum, and there is considerable slack in loop 9. The pressure-roller is shown at 36.

Figure 7:
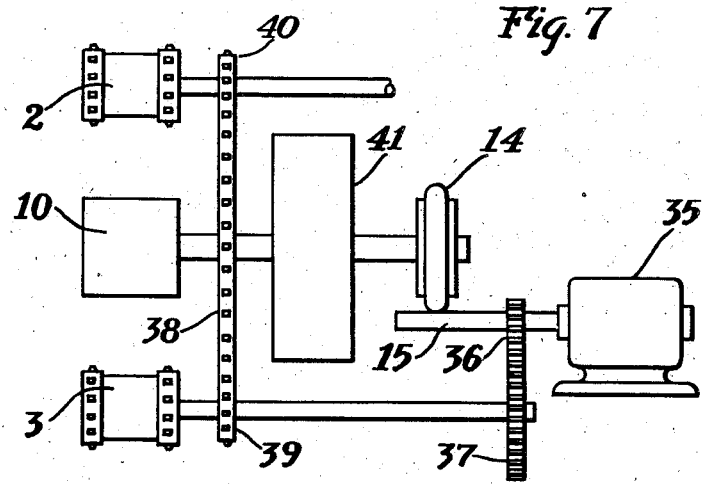
Figure 7 is a modification of the invention, similar to Fig. 6 but having an additional flywheel directly on the drum shaft.

Fig. 7 is like Fig. 6 except for the addition of a flywheel 41 mounted directly on the drum shaft. Although flywheel 41 is larger than the armature of motor 35, the latter supplies the major part of the total effective moment of inertia, owing to its higher speed. It has been found in tests that the speed constancy can in general be improved by the employment of such a direct mounted flywheel. It has little effect on slower fluctuations in speed but it can do considerable in the way of taking out small rapid fluctuations, which may be introduced through the film loops, imperfections in drum bearings, in pressure-roller action, and imperfection in the rubber tire drive.

Referring again to Fig. 4, the action of this direct-coupled flywheel is analogous to introducing inductance 32 into the circuit. It is evident that the reactance of coil 29 will not completely stop fluctuations tending to pass through ammeter 31, because 29 is by-passed by resistance 30. The introduction of a second inductance at 32 reduces the magnitude of such alternating currents through 31. As is pointed out in the aforementioned Hanna Patent No. 2,003,048, introduction of inductance 32 will not prevent effective damping or even critical damping of the entire system provided inductance 32 is small relative to 29. Critical damping as set forth in the Hanna patent requires that the inductance of 32 be not more than 1/8 of that of 29, but good results are obtained with values of inductance 32 as high as 1/4 of that 29. This would correspond to the condition that the moment of inertia of flywheel 41 multiplied by the square of its normal speed should not exceed approximately 1/4 of the moment of inertia associated with pulley 15 multiplied by the square of its speed.

In the design of a system of this kind, the problem is usually to get enough creep or "slip." There are a number of factors which will increase the slip for a given transmitted torque, for example:

The soft tire should have a high coefficient of friction and be deformed appreciably tangentially by light load.

The rubber tired wheel should have relatively low peripheral speed and preferably a rather small diameter.

The tire should be narrow and thick and should have a small area of contact.

The high-speed pulley or shaft should be of small diameter, particularly in relation to the size of the tire. It should be preferably of the same order of magnitude as the thickness of the tire measured radially, say, within a factor of two or three.

The area of contact should be small between the tire and the high-speed pulley.

Although it is difficult to set any specific values on these details, the design should employ these several factors to a degree that tension in one of the film loops which is less than that which can be transmitted by a free film loop while still maintaining the flexibility of the loop, will be sufficient to alter the drum speed by two or three percent.

I have illustrated the rubber tire as on the wheel which is mounted on the drum shaft. It may alternatively be on the engaging pulley, or rubber tires may be provided on both pulleys. The general effects will be the same. I prefer the form which I have illustrated, for the reason that it is easier to make a metal pulley accurately round and free from run-out than a rubber tire surface, and the tolerance for such imperfections is greater the larger the diameter of the wheel.

Although the tire has been described as rubber, it will be apparent that any of the natural or synthetic plastics having the necessary properties can be substituted. The properties which are most important are a high degree of flexibility, freedom from tendency to become permanently deformed, and sufficiently high coefficient of friction to make it readily possible to avoid any actual slipping. It is not necessary that the tire be of a material having high internal losses, such as Viscoloid. It may be of high resilient material such as pure gum rubber, and the damping will still be highly effective.

I claim as my invention:

1. Photophonographic apparatus comprising a drive means, a record film carrier and an aperiodically yieldable friction drive coupling the drive means and the record carrier, said drive including a member having a resilient tire of sufficient thickness in relation to its softness, width, and area of contact and the diameter of said carrier to obtain a speed differential of substantially three percent of normal operating speed when the torque being transmitted is of a magnitude less than that required to pull the film to a substantially straight line.

2. Photophonographic apparatus comprising a drive means, a record film carrier, a flywheel integral therewith and an aperiodically yieldable friction drive coupling the drive means and the record carrier, said drive including a member having a resilient contacting element of sufficient thickness in relation to its softness, width, and contact area, and the diameter of said carrier to obtain a transmitted torque not exceeding that to which the film loop might be subjected without impairing its flexibility.

3. Photophonographic apparatus comprising a drive means, a record film carrier, pulley means rigidly connected to said record film carrier, relatively small pulley means connected to the drive means, and an aperiodically yieldable friction member on the pulley means of the record carrier, engaging the pulley connected to the drive means, comprising a material elastic in form, inelastic in volume and having a thickness, width, and contact area to provide a substantially three per cent differential in speed between said two pulley means when the torque is not less than that which would impair flexibility of said film.

4. Photophonographic apparatus comprising a drive means, a record film carrier, a flywheel integral therewith, pulley means rigidly connected to said record film carrier, relatively small pulley means connected to the drive means and an aperiodically yieldable friction member on the record carrier engaging the pulley connected to the drive means comprising a material elastic in form, inelastic in volume and having a softness, thickness, width, and contact area to provide a substantially three percent differential in speed between said two pulley means when the torque being transmitted is of a magnitude less than that required to pull the film to a substantially straight line.

5. Photophonographic apparatus comprising an inertia member, a record film carrier and a rubber tire drive alone coupling the inertia member and the record carrier, said rubber tire having a thickness in relation to the softness of the tire material, the carrier diameter, the area of contact, and the width of the tire to permit a speed difference of substantially three percent of normal operating speed when the torque being transmitted is of a magnitude less than sufficient to pull the film to a substantially straight line.

6. Photophonographic apparatus comprising an inertia member, a record film carrier in the form of a sprocket, a second record film carrier in the form of a smooth roller, a flywheel integral with said roller and a rubber tire drive alone coupling the inertia member and the record carrier, said rubber tire being of sufficient thickness in relation to the softness of the tire material, the roller diameter, the area of contact, and the width of the tire to permit a speed difference of substantially three percent of normal operating speed when the torque being transmitted to said roller is of a magnitude less than sufficient to pull the film to a substantially straight line between said sprocket and said roller.

7. Photophonographic apparatus comprising a drive means, a record film carrier in the form of a sprocket driven by said drive means, a second record film carrier in the form of a smooth roller, pulley means on said second mentioned record film carrier, relatively small pulley means connected to the drive means and a tire on the pulley means on the record carrier engaging said second mentioned pulley connected to the drive means comprising a material elastic in form and having a softness, thickness, width, and contact area sufficient to provide a speed differential of substantially three percent between said second mentioned record film carrier and said drive means when the transmitted torque is insufficient to pull the film to a substantially straight line between said sprocket and said roller.

8. Photophonographic apparatus comprising a drive means, a record film sprocket driven by said drive means, a film pulled record film carrier, a flywheel integral therewith, pulley means on a record film carrier, relatively small pulley means connected to the drive means and a tire on the pulley means on the record carrier engaging the pulley connected to the drive means comprising a material elastic in form and having a thickness in relation to its softness, width, and contact area, and the diameter of said carrier to provide a speed difference between said two pulley means of substantially three percent when the transmitted torque does not exceed that to which the film loop between said sprocket and said carrier might be subjected without impairing its flexibility.

9. Apparatus for providing uniform speed of an elongated flexible record, comprising a smooth drum to which said record adheres by friction, driving means, sprockets connected to said driving means, one of said sprockets pulling said record around said drum, said means providing flexible loops of said record on both sides of said drum, a wheel mounted on the same shaft with said drum, a pulley contacting the periphery of said wheel, the wheel or the pulley being provided with a tire of flexible material, and means associated with said pulley for causing it to resist changes of speed, said tire being of sufficient thickness in relation to its softness, width, and contact area, and the diameter of said drum to permit a speed difference of substantially three percent between said drum and said wheel when the transmitted torque does not exceed that to which the film loop might be subjected without impairing its flexibility.

10. Apparatus as described in claim 9 wherein a flywheel is mounted on the shaft of said pulley.

11. Apparatus as described in claim 9 wherein said pulley is driven by an electric motor.

12. Apparatus as described in claim 9, including a flywheel mounted on the shaft with said drum.

EDWARD W. KELLOGG.